Feb. 20, 1923.　　　　　　　　　　　　　　　　　1,446,325
J. D. ALLEN
GEARLESS DIFFERENTIAL.
Original Filed Jan. 30, 1919　　　3 sheets-sheet 1

John D. Allen INVENTOR.
BY
Howard A. Coombs ATTORNEY.

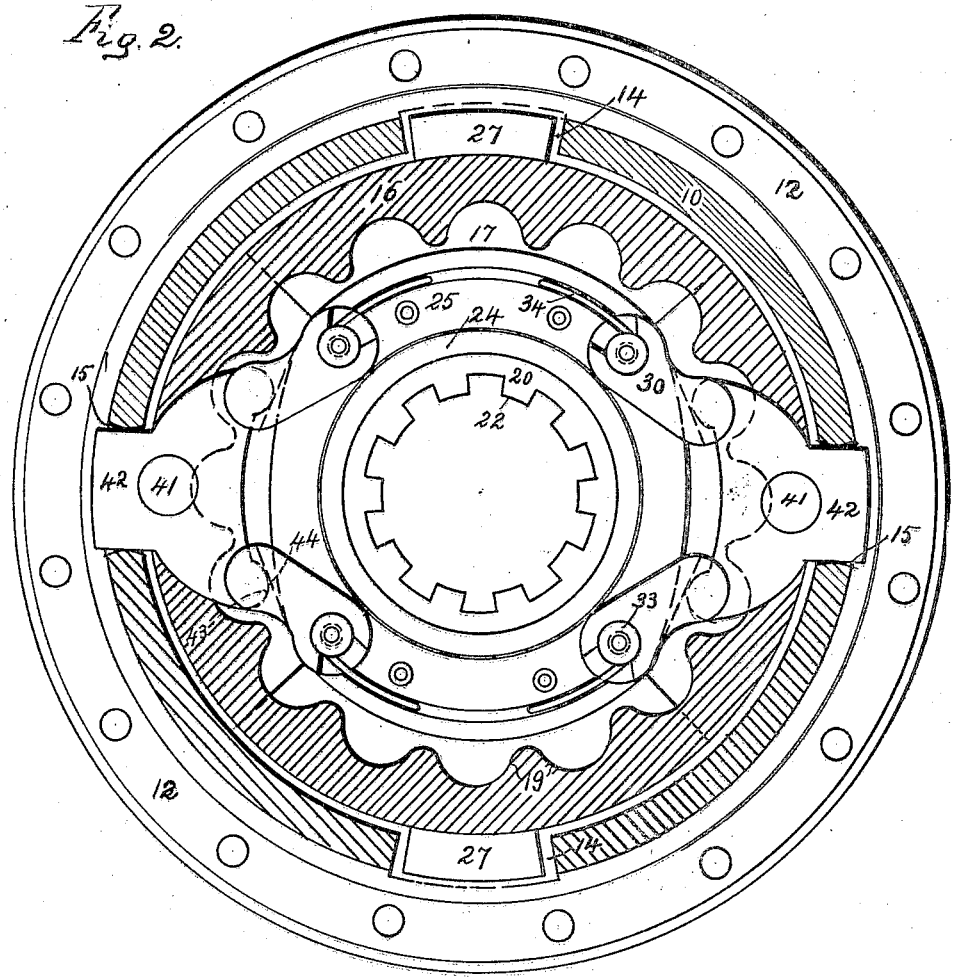

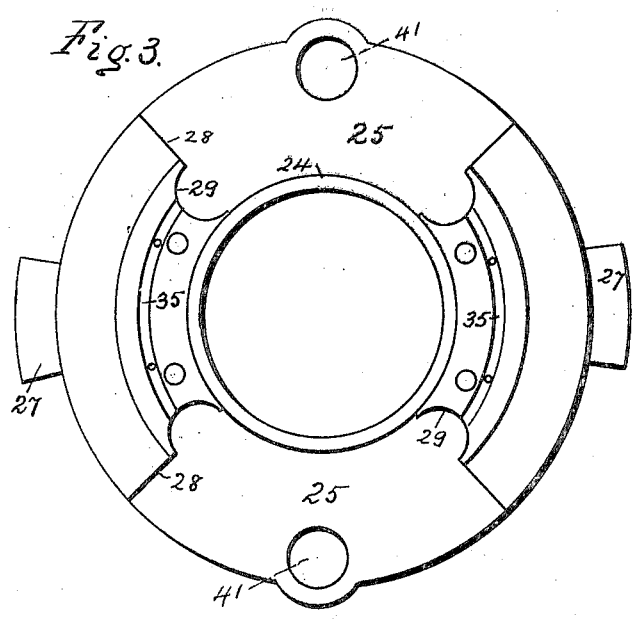
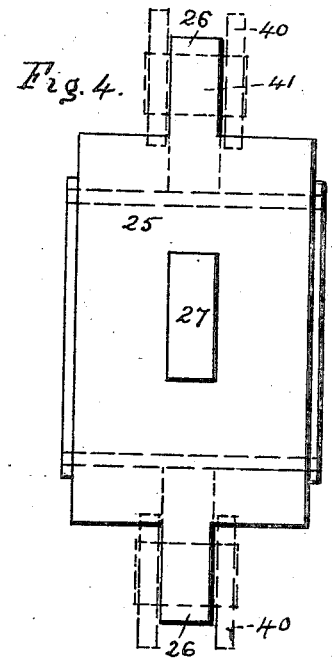
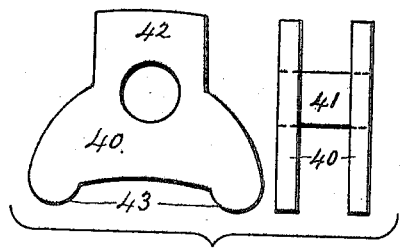
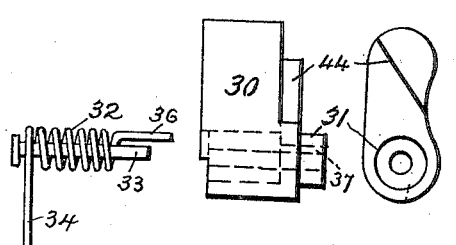

Patented Feb. 20, 1923.

1,446,325

UNITED STATES PATENT OFFICE.

JOHN D. ALLEN, OF PHILADELPHIA, PENNSYLVANIA.

GEARLESS DIFFERENTIAL.

Continuation of application Serial No. 274,009, filed January 30, 1919. This application filed July 30, 1920. Serial No. 400,111.

*To all whom it may concern:*

Be it known that I, JOHN D. ALLEN, a citizen of the United States, residing at Philadelphia, in the county of Philadelphia and State of Pennsylvania, have invented new and useful Improvements in Gearless Differentials, of which the following is a specification.

This application is filed to take the place of my application Ser. No. 274,009, filed Jan. 30, 1919 and allowed Feb. 26, 1920, which, in turn, was a continuation of my application Ser. No. 186,937, filed Aug. 18, 1917 and allowed Aug. 5, 1918.

The present invention is a development of the mechanisms covered by my Patents Nos. 1,238,730 of Sept. 4, 1917; 1,264,744 of April 30, 1918; 1,265,160 of May 7, 1918, and 1,323,384 of Dec. 2, 1919. Its object and function are the same as those of said patented mechanisms, but it accomplishes the result by improved means.

The invention may be termed, and is known as, a gearless differential, to distinguish it from the gear differential in common use, of which it is designed to take the place. Strictly speaking, however, the name "differential" is a misnomer when applied to the hereinafter described mechanism, except in so far as it permits the speed of one driven shaft to vary automatically with respect to the speed of the other driven shaft. In my said prior patents and applications, I have used the term "compensating mechanism," but that is no more strictly accurate than the term "differential." However, since it takes the place, and performs the function, of the mechanism known as the "differential," it will be known as a "differential" and, to distinguish it from the usual form, as a "gearless differential."

The distinguishing difference between the usual gear differential and my gearless differential resides in the fact that in mine the drive of the two wheel shafts is quite independent, while in the former the drive of one wheel shaft depends upon the drive of the other.

With the gear differential, when one wheel loses its traction, that is to say, does not contact with the ground or only contacts therewith with insufficient friction to cause the wheel to roll forward when the power is applied, the gear in the differential attached to the other wheel shaft stands still, the driving casing, carrying the satellite pinions, revolves, and the pinions rotate on their axes, running over the stationary gear and driving the wheel which has lost its traction at twice the speed of the casing. The result is that that wheel "spins" and the other is powerless to move the vehicle. In other words, with the gear differential, both wheels must have traction before the vehicle can be propelled. While the condition I have described, of one wheel entirely losing its traction and the vehicle consequently becoming stalled, only occurs in practice when one wheel gets into a mud-hole or the like, it is evident that the condition must frequently occur in a small degree, as, for example, in traveling at more or less high speed over somewhat rough roads, when one wheel or the other will constantly be leaving the surface, at which time, the tendency of the differential will be to increase the speed of that wheel. This makes for hard wear on the tires since, as soon as the wheel strikes the ground again, the ground acts as a friction brake to retard its speed. In going around curves with the gear differential, the speed of the outer wheel is increased at the expense of that of the inner wheel, since the satellite pinions rotate on their axes towards the gear on the outer wheel shaft and away from the gear on the inner wheel shaft. The propelling power is still divided between the two wheels—probably the outer wheel takes slightly more than half—but the outer wheel must turn faster than the casing of the differential, the increment of its speed varying inversely as the radius of the curve. The effect is that there is a constant tendency of the vehicle to sharpen the curve, that is, to reduce the radius of its curvature, which is a source of danger which the driver must counteract by the steering wheel.

The principal danger of the gear differential, however, occurs when the vehicle is coasting or running by momentum, so that the gears on the wheel shafts become the drivers of the casing through the satellite pinions. Under such conditions, as soon as one wheel runs faster than the other, the pinions are turned on their axes and react on the gear of the other wheel shaft to tend to turn it backwardly. If now the last mentioned wheel loses its traction, as often occurs on a slippery down grade, it is rotated backwardly, the vehicle skids laterally or circularly, and the vehicle is in great danger of overturning.

These defects and dangers of the gear differential in ordinary use today are entirely obviated and overcome by the use of the mechanism constituting the present invention which has been found in practice to result in a considerable saving in power (gasolene) and increase in the life of the tires, in addition to preventing delays on account of the vehicle getting into a mud hole or the like, and reducing the danger of skidding and overturning.

The essence of my invention consists in the means whereby each wheel shaft is driven quite independently of the other, yet either wheel is free to turn faster than the other, as when rounding a curve. These conditions hold true for backward drive as well as for forward. In rounding a curve the inner wheel does all the work of propelling the vehicle, the outer wheel running free until its speed becomes equal to that of the inner wheel again. If one wheel loses its traction, the other is available to drive the vehicle. The mechanism is so designed as to be of ample strength to take care of the heaviest truck loaded to its ultimate capacity. There is no internal friction in the mechanism, as there is in the gear differential, and there is no shock felt, or click heard, when the drive shifts from forward to reverse, as when the motor is throttled and the vehicle runs by momentum. These and other advantages are obtained by the construction and combination which will now be described in detail, in connection with the accompanying drawings, in which:

Fig. 2 is a cross section through the same, on line 2—2 Fig. 1;

Figs. 3 to 6 are detail views of the parts.

Figure 1:
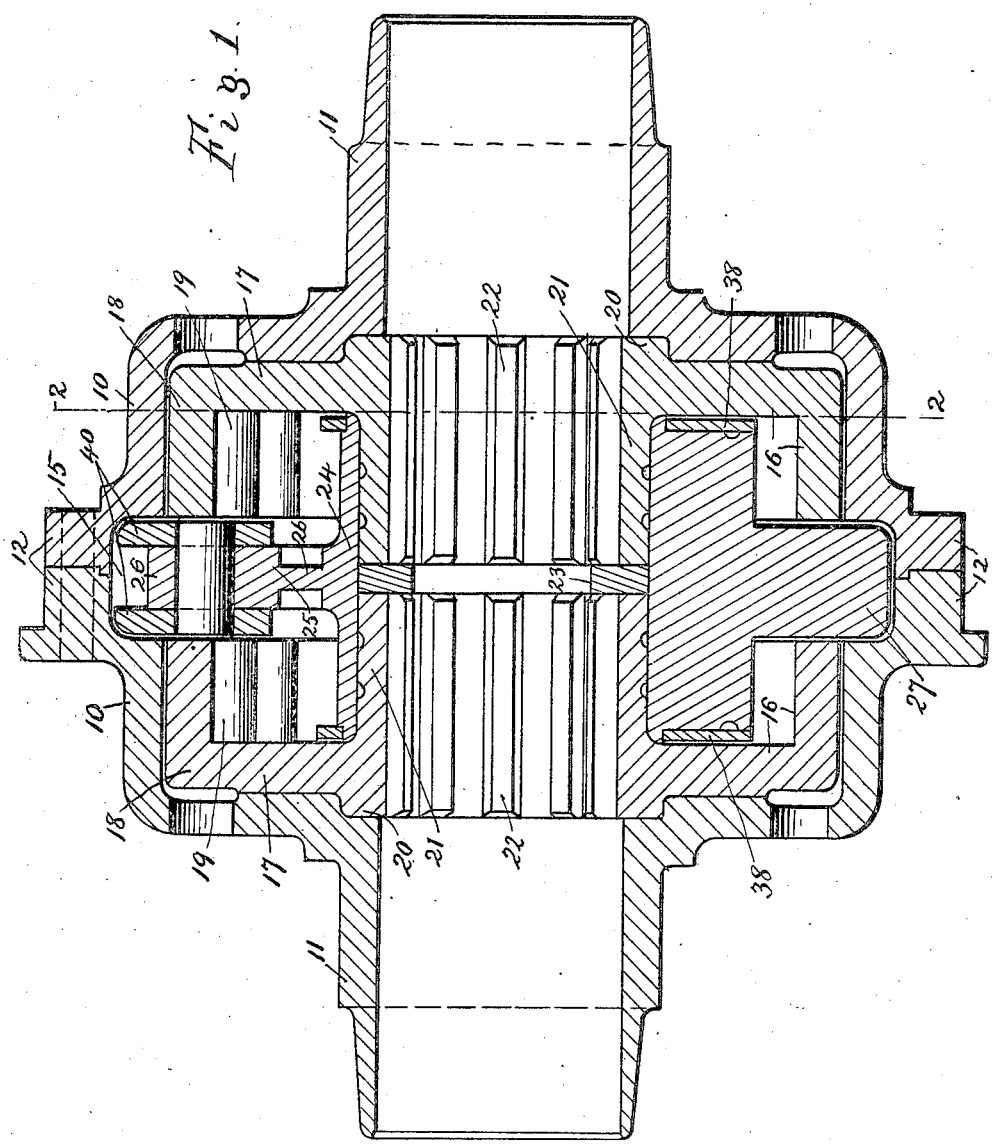
Fig. 1 is a longitudinal central section through the differential mechanism.

The driving casing 10, made in two parts as usual, comprises the hubs 11, adapted to be journalled in bearings carried by the differential housing of the rear axle, and flanges 12, between or to which the driving or ring gear, not shown, is bolted. It is immaterial, as far as this invention is concerned, how the power from the motor power shaft is transmitter to the casing. This casing is slotted or recessed in its periphery at two pairs of diametrically opposite points, 14, 14, and 15, 15, for a purpose which will hereinafter be explained.

Two driven members 16, 16, are turnably fitted within the casing and each comprises a web 17, an inwardly extending peripheral flange 18, within which are cut the rounded ratchet teeth 19, a short external rub 20, fitting a recess in the casing, and a longer internal hub 21, the hubs being internally splined, as at 22, for engagement with the ends of the wheel shafts, not shown. A washer or ring 23 is preferably placed between the adjacent inner ends of the driven member hubs, as shown.

On the hub members 21 is mounted the hub 24 of an intermediate member 25, which I term the spider, and comprising, in addition to said hub, the web 26 and the diametrically opposite lugs 27, 27, which engage in the slots or recesses 14, 14, in the casing. There is a small amount of play or lost motion between said lugs and slots, as shown in Fig. 2, the function of which will be apparent later on. This spider is recessed on both sides at diametrically opposite places, as shown at 28, the ends of each recess being rounded to constitute a seat 29 for the pawl 30, the two pawls in each recess facing in opposite directions. There are therefore four pawls on each side of the spider, two for forward drive and two for reverse drive. Each pawl has a short trunnion 31, seated in a hole in the spider, and is normally pressed into engagement with the ratchet teeth 19 by a coil spring 32, seated in a bore in the pawl and maintained in position therein by a headed pin 33. The outer end 34 of the spring lies in a groove 35 in the spider, and the inner end 36 fits in a hole 37 in the pawl. Cap plates 38, screwed to the sides of the spider, hold the pawls and springs in place.

There remains to be described the means by which the pawls are disengaged from the ratchet teeth when the drive changes from forward to reverse, which means constitute the essential feature of the present invention. It consists in cams 40, 40, pivotally mounted on the spider, as by the pins 41, 41, having lugs 42, snugly engaging in the slots or recesses 15 in the casing, and having noses 43, 43, which engage the pawls to force them inwardly out of engagement with the ratchet teeth. As shown, each cam consists of two duplicate parts carried by the pin 41, one on each side of the web 26 of the spider, each of said parts being arranged to engage alternately two pawls, one facing each way. Each cam can be made in one piece, if desired, and may act directly on the nose of the pawls, as shown in the drawing of my application aforesaid, Ser. No. 274,009, but I find that the action is improved by having the noses of the cams act upon shoulders 44 formed on the sides of the pawls. The cams now have more of a rolling action on said shoulders than a direct push, which tends to eliminate any danger of the pawls sticking. In Fig. 2, both forward and reverse pawls are shown in the neutral position and the lugs 27 of the spider are shown as centrally located in the slots 14 in the casing. Now, whichever way the casing is turned, it will move relatively to the spider until one or the other end of said slots engage said lugs, which movement, from neutral position, does not amount to more than three thirty-secondths of an inch. Such relative movement of the casing on the spider must rock the cams on their pivots, since the lugs 42 have no lost motion in the slots 15 in the casing. The rocking of the cams, one way or the other, presses the pawls facing one way out of the path of the ratchet teeth and allows the pawls facing the other way to move, under the influence of their springs, into engagement with said teeth, so that all the pawls facing one way are in engagement with the teeth of the driven members by the time the ends of the slots 14 come into driving engagement with the lugs 27 of the spider. The teeth 19 and the spaces between them are so shaped that, if the pawls are not fully seated at the moment the spider commences to drive, they will slip into full engagement automatically. The parts are so proportioned and arranged that the disengaged pawls are always in proper position to come into engagement with the teeth as soon as permitted to do so by the cams.

It will readily be understood that a mechanism of this kind must be of great strength to withstand the tremendous forces transmitted through it, and must be absolutely certain in its operation, as well as practically immune from wear. The mechanism above described possesses all these attributes to a marked degree and has proved eminently satisfactory under very trying conditions of use. The mode of assembling and fitting the driven members within the hubs of the casing and spider makes it impossible for any displacement of said parts to occur. It will be seen that the parts which take the load do so under compression so that there is no possibility of their breaking, while the only surfaces subjected to any appreciable wear are the tops of the teeth and the noses of the pawls, when the former overrun the latter owing to the outer wheel on a curve traveling faster than the inner wheel and driving casing.

The mode of operation of the mechanism has been sufficiently described above. Either driven member is free to overrun the pawls whenever the wheel connected to it has to cover more ground in a given time than the wheel on the other side of the vehicle. If one wheel loses its traction, the power is transmitted through the other wheel, and the same is true if one wheel is turning faster than the other, as in rounding a curve. When the vehicle runs by momentum, the pawls are changed and the driven members become the drivers, through the reverse pawls, of the casing, ring gear and motor, if the clutch is left in. It is an utter impossibility for one wheel to turn backwardly while the vehicle is moving forwardly, as well as for one wheel to "spin" while the other stands still. Thus all the objectionable characteristics of the ordinary gear differential are eliminated in my gearless differential, which, nevertheless, can do everything which the gear differential can do, besides doing things which the gear differential cannot do. As I have stated, the use of my gearless differential in place of the old gear differential has been proved to result in a very marked saving in fuel and wear of tires, as well as giving the driver more complete and safe control of his vehicle.

Having thus described my invention and its mode of operation, what I claim as new is:

1. In a mechanism of the class described, the combination of a driving casing having slots in its periphery and provided with hubs adapted to be journalled in fixed bearings; a spider within said casing having lugs loosely fitting certain of said slots and provided with a hub; two driven members, each having a set of ratchet teeth, and a hub journalled in the said hubs of the casing and of the spider; oppositely facing pawls carried by said spider to engage said teeth; and pawl actuators pivotally carried by the spider and having lugs snugly fitting others of said slots.

2. In a mechanism of the class described, the combination of a driving casing having slots in its periphery, an intermediate driving spider located centrally in said casing and having diametrically opposite lugs loosely fitting two of said slots, two independent driven members located within said casing one on each side of said spider and each comprising an internal ratchet wheel, pairs of oppositely facing pawls seated on opposite sides of said spider, springs tending to hold said pawls in engagement with said ratchet wheels, and cams pivoted on said spider in position to engage either one of a pair of oppositely facing pawls to disengage it from its ratchet wheel, each cam having a lug engaging another of said slots in the casing.

3. In a mechanism of the class described, the combination with a hollow driving member; an intermediate member therein having a positive but lost motion connection with said driving member and two independent driven members each provided with ratchet teeth; of means for operatively connecting said intermediate member to one of said driven members for rotation in one direction, and other means for operatively connecting said intermediate member to the other driven member for rotation in the other direction, and rocking means, carried by said intermediate member and controlled by the position of the latter relatively to said driving member, to disengage the connecting means operative for rotation in one direction while permitting that operative in the other direction to remain connected.

4. In a mechanism of the class described, the combination of an outer driving member provided with power connections; an intermediate driving member capable of a limited turning movement in said outer member; two driven members, one on each side of said intermediate member; pawl and ratchet connections between said intermediate and driven members for driving the latter in either direction; and cams, carried by said intermediate member for engaging said pawls and provided with parts engaged by said outer driving member, whereby the pawls for driving in one or the other direction are always disengaged, depending upon the relative position of the outer and intermediate members.

5. In a mechanism of the class described, the combination of a driving casing; a spider within the same and capable of only a limited rotary movement relatively thereto; a driven member on each side of said spider and provided with internal ratchet teeth; oppositely facing pawls carried by said spider in position to engage said teeth; springs tending to hold said pawls in engagement; and means, independent of the pawls, carried by the spider and engaged by the casing, and actuated by the relative rotation of the casing and spider, to disengage the pawls facing one way while permitting those facing the other way to engage said teeth.

6. In a mechanism of the class described, the combination of a driving member, composed of a hollow casing carrying a gear, and a central spider having a positive connection with said casing but capable of a slight turning movement therewithin; a driven member on each side of said spider and provided with a toothed annulus; two pairs of oppositely facing pawls carried by said spider in position to engage each annulus; cams carried by said spider in position to engage one of each pair of pawls at a time, and means on said cams and in engagement with said casing, whereby said cams are actuated, when relative movement occurs between the casing and spider, to disengage the pawls facing one way.

7. In a mechanism of the class described, the combination of a two-part driving member, the parts of which can turn slightly relatively to each other; two driven members therein having means to non-rotatively connect them to the shafts to be driven and each comprising an internal ratchet wheel; pawls carried by one of said parts; springs holding said pawls in engagement with said ratchet wheels; and cams, carried by the same part as the pawls but in engagement with the other part, for disengaging one half of the pawls at a time according to the relative position of the two parts of the driving member.

8. In a mechanism of the class described, the combination of a member constructed to be operated by power and constituting a hollow casing adapted to be journalled in bearings; a spider within said casing and having a lost motion driving connection therewith; two driven members journalled within said casing and spider and constructed to be connected to the shafts to be driven, each of said driven members having an internal ratchet wheel; pairs of oppositely facing pawls mounted on said spider in position to engage said ratchet wheels; springs to hold said pawls in engagement therewith; and cams pivotally mounted on said spider and having a part engaged by said casing, whereby they are rocked whenever a relative angular movement takes place between the casing and spider, each cam alternatively engaging one or the other of a pair of oppositely facing pawls to disengage it from the adjacent ratchet wheel.

9. In a mechanism of the class described, the combination with the driving casing, the intermediate member having a limited rotary movement relative to the casing, and the driven members each comprising an internal ratchet wheel, of pawls carried by the intermediate member and spring pressed into engagement with said ratchet wheels, each pawl having a lateral shoulder, and cams pivoted on said intermediate member and having parts engaged by said driving casing, whereby they are rocked on their pivots when relative rotary movement takes place between the casing and the intermediate member, each cam engaging alternatively the shoulder on one of a pair of said pawls to disengage it from its ratchet wheel, the pawls of each pair facing in opposite directions.

10. In a mechanism of the class described, the combination with a driven member having internal ratchet teeth and a driving member carrying spring pressed pawls to engage said teeth, each pawl having a shoulder formed on one side, of cams carried by said driving member in position to act on said shoulders to disengage said pawls.

11. In a mechanism of the of the class described, the combination with a driven member having internal ratchet teeth, of a driving member comprising an inner and an outer part capable of a limited relative angular movement, spring pressed pawls carried by said inner part in position to engage said teeth, a shoulder on the side of each pawl, and cams carried by said inner part and actuated by the angular movement of the same within said outer part, said cams acting upon said shoulders with a rolling action to disengage said pawls, one half of the pawls being arranged to drive in one direction and the other half in the other direction, and the cams, when in one position, disengaging one half of the pawls while permitting the other half to remain in engagement.

12. A gearless differential mechanism, comprising in combination with the driving member and the two driven members, of an intermediate member driven by said driving member but capable of a slight rotative movement relatively thereto, and means to connect said intermediate member to said driven members to drive them in either direction, said means comprising internal ratchet teeth on said driven members and spring pressed pawls on said intermediate member, half of the pawls facing one way and the other half the other way, and means to hold half of the pawls disengaged at any given time, said means comprising cams carried by said intermediate member and operatively engaged by said driving member, said cams being operated to release one half the pawls and disengage the other half whenever relative rotative movement takes place between the driving member and the intermediate member.

13. A gearless differential mechanism, comprising a driving casing, two driven members therein, a spider intermediate said casing and driven members, said spider having a lost motion engagement with said casing, oppositely facing means carried by the spider to connect it to the driven members for drive in either direction, and independent means carried by the spider and having operative engagement with the casing, for permitting only the connecting means facing one way to be operative at any one time.

14. A gearless differential mechanism, comprising a hollow driving casing, two alined driven members therein and each provided with ratchet teeth, a spider centrally located within said casing between said driven members, said spider having a positive lost motion driving connection with said casing, oppositely facing independent pawls pivoted on each side of said spider and spring pressed into engagement with the adjacent ratchet teeth, and separate means, carried by said spider and engaged by said casing, to alternately disengage the oppositely facing pawls.

In testimony whereof I have hereunto set my hand.

JOHN D. ALLEN.